United States Patent [19]

Fujimoto et al.

[11] 3,981,019
[45] Sept. 14, 1976

[54] CHARGING SIGNAL SUPPLY CIRCUIT FOR INK JET SYSTEM PRINTER

[75] Inventors: Isao Fujimoto, Kunitachi; Takeshi Kasubuchi; Masahiko Aiba, both of Nara, all of Japan

[73] Assignees: Nippon Telegraph and Telephone Public Corporation, Tokyo; Sharp Kabushiki Kaisha, Osaka, both of Japan; part interest to each

[22] Filed: Sept. 26, 1974

[21] Appl. No.: 509,561

[30] Foreign Application Priority Data

Sept. 26, 1973 Japan............................. 48-108777

[52] U.S. Cl.................................... 346/75; 307/236
[51] Int. Cl.²......................................... G01D 18/00
[58] Field of Search ............... 346/75; 307/236, 243

[56] References Cited
UNITED STATES PATENTS

| | | | |
|---|---|---|---|
| 3,154,697 | 10/1964 | Widmer et al. | 307/243 |
| 3,596,276 | 7/1971 | Lovelady | 346/75 X |
| 3,750,191 | 7/1973 | Naylor | 346/75 |
| 3,866,237 | 2/1975 | Meier | 346/75 |

*Primary Examiner*—Joseph W. Hartary
*Attorney, Agent, or Firm*—Stewart and Kolasch, Ltd.

[57] ABSTRACT

An ink jet system printer of the charge amplitude controlling type wherein a predetermined phase relationship is established between separation of ink drops from a nozzle to a record receiving member and application of charging signals to a charging electrode, through detection of the amplitude of charge carried on ink drops contributable to phase determination. Charging signals of one polarity containing intelligence signals are supplied to the charging electrode to charge ink drops contributable to printing, whereas phase detecting signals of the opposite polarity to that of the charging signals are supplied to the charging electrode for the purpose of charging ink drops contributable to phase determination. Both of the charging signals and the phase detecting signals are mixed in a mixer circuit arrangement of a simple construction which consists of a pair of switches, before both signals are supplied to the charging electrode.

2 Claims, 5 Drawing Figures

CHARGING SIGNAL SUPPLY CIRCUIT FOR INK JET SYSTEM PRINTER

The present invention relates to a circuit system for use in an ink jet system printer of the charge amplitude controlling type which supplies charging signals to the charging electrode of the ink jet system printer.

More particularly, an object of the present invention is the provision of a simplified, low cost implementation of the function of mixing charging signals and phase detecting signals having different polarities, which is useful with the charge amplitude controlling type of an ink jet system printer wherein a phase relation is corrected or maintained at an optimum one from time to time during print procedure.

The above-mentioned and other objects and features of the present invention and the manner of attaining them will become more apparent and the invention itself will be best understood by reference to the following description of an embodiment of the invention taken in conjunction with the accompanying drawings, wherein.

Figure 1:
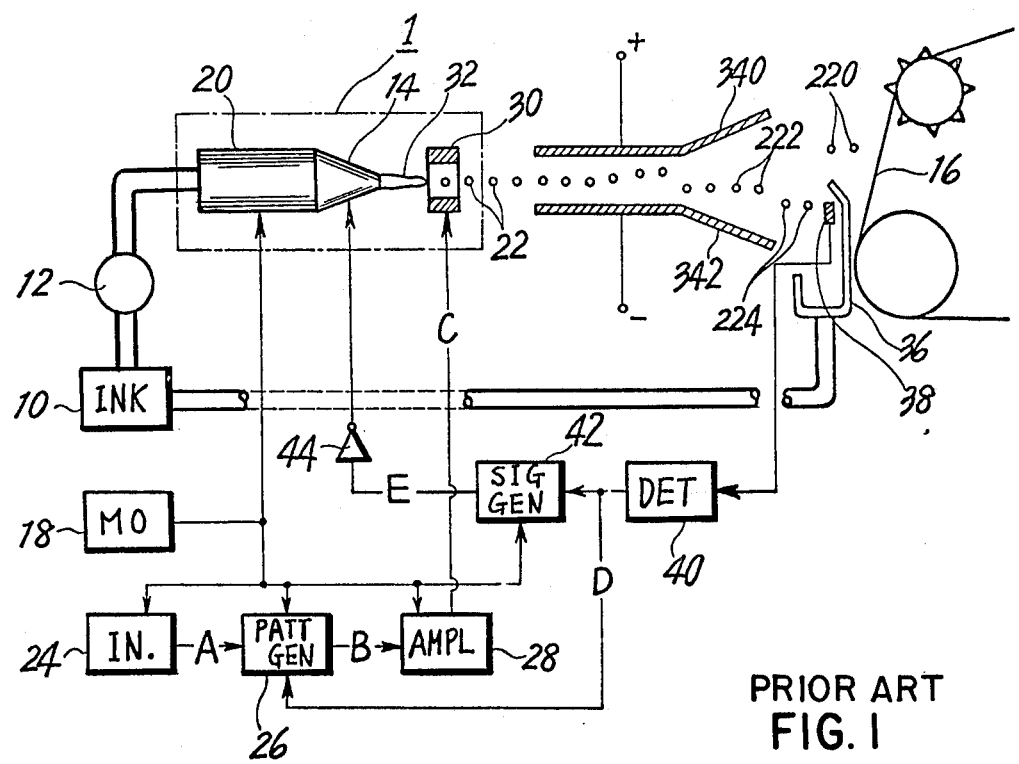
FIG. 1 is a schematic circuit diagram of an ink jet system printer of the charge amplitude controlling type equipped with a phase synchronization scheme.

Before discussing the circuit system in accordance with the present invention in greater detail, it may be of advantage to explain the operational principles of an ink jet system printer of the charge amplitude controlling type equipped with a phase synchronizing scheme with reference to FIG. 1.

In this drawing the ink liquid within an ink reservoir 10 is sent under pressure through a pump 12 to a nozzle 14 which in turn issues a number of ink drops toward a record receiving member 16 in the following manner. An electromechanical transducer 20 which is excited by outputs from a master oscillator 18 of a given oscillation frequency for example such as 25 KH$_z$, is mounted on the nozzle 14 so that vibration of the electromechanical transducer 20 causes perturbation in the ink liquid issued from the nozzle 14. The result is separation of ink drops 22 of equal mass at a fixed interval corresponding to the vibration frequency.

A character pattern generator circuit 26 translates intelligence signals A from an input unit 24 such as a tape reader or a keyboard into a charging pulse train B in accordance with a predetermined print format. Charging signals C after being amplified through an amplifier 28 are impressed on a charging electrode 30. At the instance of a break of an ink stream 32 into the ink drops 22, they are charged to a voltage level corresponding to a potential at the charging electrode 30, and then deflected in accordance with the amplitude of charge thereon as they pass a fixed high voltage electric field which is created by means of a pair of deflection electrodes 340, 342. Thereafter, the ink drops 22 contributable to writing operation are deposited on the record receiving member 16. It is to be noted that it is necessary for the purpose of ensuring well defined printing that the amplitude of charge originated by the charging electrode 30 corresponds accurately to the charging signals C. A beam gutter 36 serves to return the ink drops 22 not contributable to writing operation back to the ink reservoir 10.

Although the frequency of generation of the ink drops 22 is well in agreement with that of the outputs from the master oscillator 18, the phase of separation into the ink drops 22 and hence the timings of generation of the ink drops will vary somewhat dependent upon various factors such as viscosity, surface tension, etc. of the ink liquid. As the consequence of such variations, there is a deviation of the amplitude of charge on the ink drops 22 from the desired value and in other words a great possibility of creating printing distortion and printing error. One approach is effective in stabilizing the generation timings for the ink drops 22, by which ink liquid is held at a predetermined temperature so that the above discussed factors such as viscosity, surface tension and so forth are held at the respective fixed values. Also is effective for the same purpose another approach wherein a phase relation between the separation into the ink drops and the application of the charging signals is established at an optimum one by charging some of the ink drops 22 through phase detecting signals of a fixed voltage level and detecting the amplitudes of charges on that ink drops.

Generally speaking, in the charge amplitude controlling type of the ink jet system printer, vertical deflection is effected by the above discussed electrostatic deflection technique whereas horizontal deflection is substantially substituted by traveling in the horizontal direction a printing head carrying the nozzle 14, the electromechanical transducer 20 and the charging electrode 30. In the prior art phase synchronizing technique phase detecting signals are originated for phase synchronization only when the printing head 1 is in its home position or the most left side position. Nevertheless, this technique can not sense phase error in the course of the one line printing procedure nor obtain good distortion immunity.

An improvement on the phase synchronization scheme which avoids the above-mentioned shortcoming has been prosposed and shown in U.S. Pat. application Ser. No. 434,218, filed Jan. 17, 1974 by inventors of this application now abandoned, and assigned to assignee of this application. In the improved phase synchronization technique specific ink drops are charged each character interval by phase detecting signals for the purpose of phase synchronization and, as an alternate, specific ink drops contributable to phase detection are interposed between two adjacent ink drops assigned to writing operation so that phase coincidence is accomplished for each ink drop assigned to the writing purpose.

However, although it is possible that the charge detecting signals have the same polarity as that of charging signals in the earlier phase synchronization technique wherein a phase determination is effected only at the home position, the polarity of the phase detecting signals should be opposite to that of the charging signals in the improved synchronization technique as set forth in the above-identified prior application for the reason that the ink drops should be deflected in the opposite direction to the ink drops assigned to the writing procedure.

Reverting now to FIG. 1, the ink drops 224 charged by the phase detecting signals E are electrostatically deflected in the opposite direction to the ink drops 220 assigned to the writing procedure and then the amplitude of charge on the phase detection ink drops 224 is sensed by means of a detection electrode 38 or other similar detection means. Outputs from a charge amplitude detector circuit 40 introduced into a phase detecting signal generator circuit 42 and the character pattern generator circuit 26 as set forth previously, control the phase of the charging signals in a manner to always establish a phase or timing coincidence between the generation of the ink drops 22 and the application of the charging signals.

Figure 2:
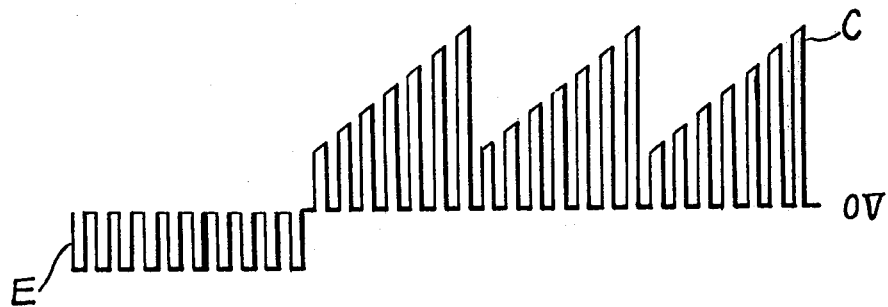
FIG. 2 is an exemplary waveform showing charging signals and phase detecting signals useful with the present invention.

FIG. 2 is a waveform chart illustrating typical charging signals C and phase detecting signals E.

The charging signals C are normally pulsewise analog signals of several hundred volts. Only the predetermined ink drops 220 are charged and deflected in accordance with the intelligence signals to be printed and thus deflected ink drops 220 in combination form desired symbols in a dot matrix. The illustrative waveform shown by FIG. 2 is useful with the phase synchronization technique wherein phase control is effected each one character printing operation.

Figure 3:
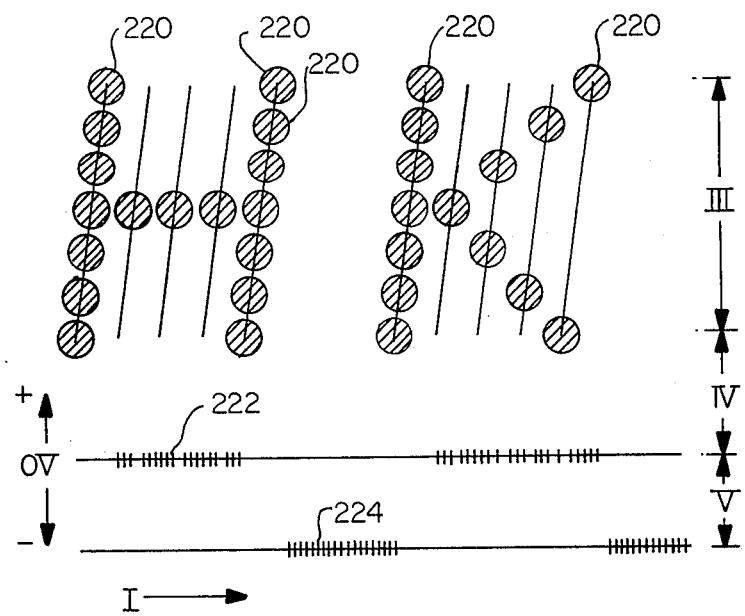
FIG. 3 is a graphic representation of an ink drop writing pattern.

FIG. 3 shows the relations between the respective positions at which the ink drops 22 charged by application of the charging signals arrive on the record receiving member 16, the respective positions representing the deposition of the ink drops 22.

As discussed above, the ink drops 220 contributable to the writing procedure and charged by the charging signals C are under the influence of electrostatic deflection in correspondence with the amplitude of charge thereon as they pass through the deflection electrodes 340, 342, with the resulting deposition thereof on the record receiving member 16. On the other hand, the ink drops 222 not contributable to the writing procedure travel freely toward the beam gutter 36 without any influence of deflection. The ink drops 224 assigned to the phase detection procedure are deflected in the opposite direction to the writing ink drops 220 and then arrive at the detection electrode 38. In this way, the charging signals are essentially classified into three major regions; character voltage level region III; erasing voltage level region IV; and phase detecting voltage level region V. In FIG. 3, the arrow I indicates the direction in which the printing head 1 travels. For the sake of illustration the respective ink drops are not necessarily shown in their actual sizes.

A total of the three kinds of the voltage level amounts to 500 – 700 volts and accordingly great difficulty arises in obtaining a large-amplitude amplifier. In the conventional prior art, as illustrated in FIG. 1, the phase detecting signals E are supplied to the nozzle 14 through an inverter 44 while the charging electrode 30 receives only the charging signals C. However, there is still difficulty establishing electrical isolation between the nozzle 14 and the electromechanical transducer 20.

Pursuant to the teachings of the present invention, the charging signals and the phase detecting signals having the opposite polarities to each other are mixed in a mixer circuit arrangement, the mixture thereof being supplied to the charging electrode 30.

Figure 4:
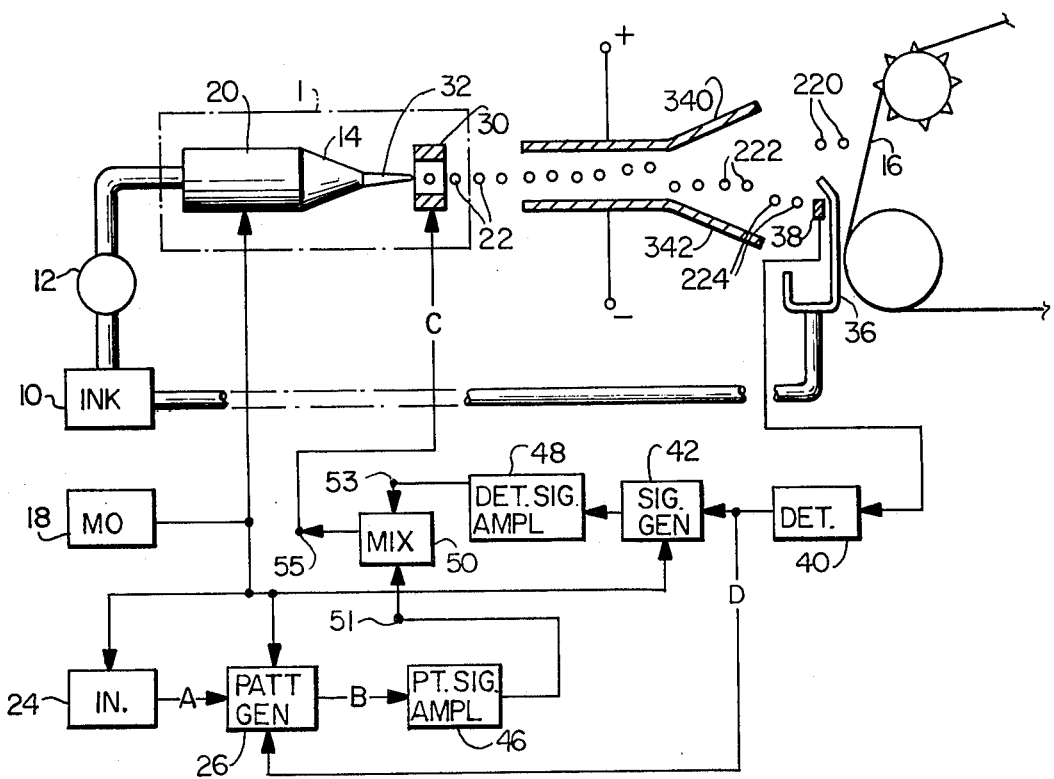
FIG. 4 is a schematic circuit block diagram of a mixer circuit arrangement in accordance with the present invention.

In FIG. 4 illustrating a schematic circuit diagram of a circuit arrangement embodying the present invention, a large-amplitude amplifier 46 in charge of the character voltage level and of the erasing voltage level is connected to the output lines of the character pattern generator circuit (see FIG. 1). Another large-amplitude amplifier 48 in charge of the phase detecting voltage level is connected to the output lines of the phase detecting signal generator circuit 42 (see FIG. 1). A mixer circuit 50 or the major component of the present invention delivers its output which in turn is supplied to the charging electrode 30 (see FIG. 1).

Figure 5:
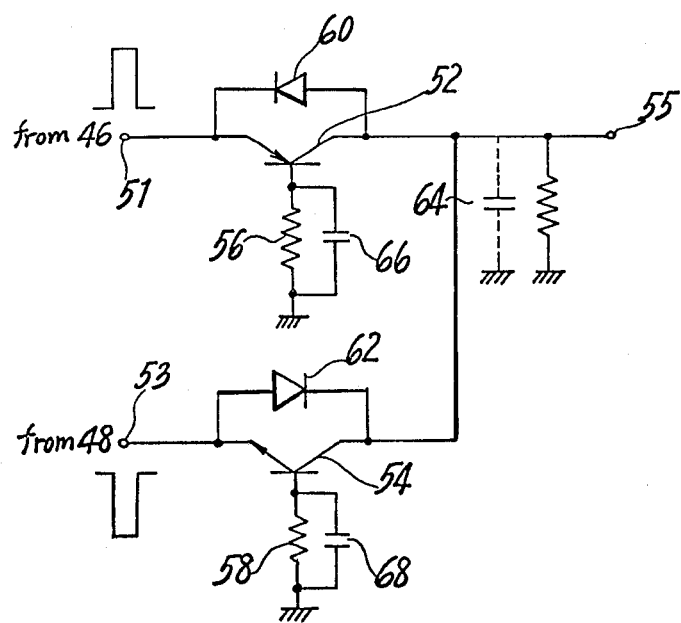
FIG. 5 is a detailed circuit diagram of an example of the mixer circuit arrangement of the present invention.

Referring to FIG. 5, there is illustrated a circuit construction of one example of the mixer circuit 50 which comprises a PNP type transistor 52, a NPN type transistor 54 and diodes 60, 62.

The charging signals C of the positive polarity applied to an input terminal 51 causes switching of the PNP type transistor 52 between its conductive state and non-conductive state, whereas the phase detecting signals E having the negative polarity to an input terminal 53 changes the state of the NPN type transistor 54 between its conductive and non-conductive states.

When the input terminal 53 is held at zero potential, the NPN type transistor 54 is held at the non-conductive state and thus application of the positive polarity signals to the input terminal 51 initiates flow of current which biases the PNP transistor 52 through the use of a resistor 56 and renders the same conductive. It follows that voltage level at an output terminal 55 swings to the same voltage level as the input terminal 51. However, a stray capacitance 64 tends to develop deterioration in the trailing edge of the voltage appearing at the output terminal 55. To this end, the diode 60 is connected to provide charge storage with a discharge path to the input terminal 51.

When the other input terminal 51 is held at zero potential, the PNP type transistor 52 is held at the non-conductive state and current flows through the NPN transistor 54 and biases the same in response to the negative potential signals applied to the input terminal 53. As a result, the NPN type transistor 54 is turned to its conductive state and the potential at the output terminal 55 is equal to that of the signals applied to the input terminal 53. As regarding the leading edge of the signals applied to the input terminal 53, the use of the diode 62 serves to discharge charge storage on the stray capacitance 64 to the input terminal 53 and then to improve response characteristics. Capacities 66, 68 are speed up capacities useful for on-off control for the transistors 52, 54.

As noted earlier, both of the charging signals and the phase detecting signals can be derived easily from the same output terminal 55 by connection of the output line of the large-amplitude amplifier 46 with the input terminal 51 and by connection of the output line of the large-amplitude amplifier 48 with the other input terminal 53. The signals having different polarities should not be supplied to the input terminals 51, 53 simultaneously.

Although the outputs from the mixer circuit 50 are impressed on the charging electrode 30 in the above discussed embodiment, the same may be applied directly to the nozzle 14.

The invention being thus described, it will be obvious that the same way be varied in many ways. Such variations are not to be regarded as a departure from the spirit and scope of the invention, and all such modifications are intended to be included within the scope of the following claims.

What we claim is:

1. In an ink jet system printer for making a record on a writing medium by means of ink drops charged by application of first signals of one polarity to an ink drop issuance unit of said printer, wherein a predetermined phase relation is established between the application of the first signals and ink drop formation through the use of additional ink drops not contributable to writing procedure, the additional ink drops being charged by application of second signals of the opposite polarity to said first signals, said first and second signals occurring during mutually exclusive intervals:

means for mixing said first signals and said second signals having the different polarities, the mixture thereof being supplied to the ink drops issuance unit; and said mixing means comprising first and second amplifier means responsive, respectively, to said first and second signals to amplify same, and first and second switch means responsive, respectively, to said amplifier first and second signals to supply same to said ink drop issuance unit;

wherein said ink drop issuance unit includes a charging electrode for charging said ink drops;

wherein said first and second switch means interconnected said first and second amplifiers with said charging electrode to apply said amplified first and second signals to said charging electrode;

wherein said first and second switch means comprise first and second transistors of respectively opposite polarity; and wherein each of said transistors have an input and an output electrode and each said switch means further includes diode means interconnecting said input and output electrodes, the forward direction of each said diode means being opposed to said amplified signal transmitted by its respectively associated transistor to preclude stray capacitance loss in said signals.

2. An ink jet system printer comprising:

a nozzle for issuing writing ink drops and phase detecting ink drops therefrom;

means for generating first and second signals effective to charge said writing ink drops and said phase detecting ink drops respectively;

a charging electrode disposed in the wake of the ink drops for charging said writing ink drops and said phase detecting ink drops;

a pair of deflection electrodes for deflecting said writing ink drops and said phase detecting ink drops in response to the amplitude of charge thereon, said first signals and said second signals being different in polarity so that said writing ink drops charged by said first signals are deflected in one direction and said phase detecting ink drops charged by said second signals are deflected in the opposite direction to said writing ink drops; and means interposed between said generating means and said charging electrode for mixing said first signals and said second signals, the mixture thereof being supplied to said charging electrode;

said first and second signals comprising voltage signals occurring, respectively, within a character voltage region of positive polarity and a phase detecting voltage region of negative polarity;

said character and said phase detecting voltage regions being separated by an erase voltage region of positive polarity;

wherein said mixing means comprises first and second amplifier means responsive, respectively, to said first and second signals to amplify same, and first and second switch means responsive, respectively, to said amplified first and second signals to apply same to said charging electrode;

wherein said ink drop issuance unit includes a charging electrode for charging said ink drops;

wherein said first and second switch means interconnect said first and second amplifiers with said charging electrode to apply said amplified first and second signals to said charging electrode;

wherein said first and second switch means comprise first and second transistors of respectively opposite polarity; and wherein each of said transistors have an input and and output electrode and each said switch means further includes diode means interconnecting said input and output electrodes, the forward direction of each said diode means being opposed to said amplified signal transmitted by its resspectively associated transistor to preclude stray capacitance loss in said signals.

* * * * *